United States Patent
Casiraghi et al.

(12)

(10) Patent No.: US 6,278,825 B1
(45) Date of Patent: Aug. 21, 2001

(54) OPTICAL FIBRE CABLE HAVING HIGH TRACKING RESISTANCE

(75) Inventors: Flavio Casiraghi, Osnago; Enrico Consonni, Seregno, both of (IT)

(73) Assignee: Pirelli Cavi e Sistemi S.p.A., Milan (IT)

( * ) Notice: Subject to any disclaimer, the term of this patent is extended or adjusted under 35 U.S.C. 154(b) by 0 days.

(21) Appl. No.: 09/462,848

(22) PCT Filed: Jul. 9, 1998

(86) PCT No.: PCT/EP98/04260

§ 371 Date: Apr. 4, 2000

§ 102(e) Date: Apr. 4, 2000

(87) PCT Pub. No.: WO99/04300

PCT Pub. Date: Jan. 28, 1999

(30) Foreign Application Priority Data

Jul. 18, 1997 (EP) .................................................. 97112328

(51) Int. Cl.$^7$ ...................................................... G02B 6/44
(52) U.S. Cl. ............................ 385/100; 385/112; 385/109
(58) Field of Search ...................................... 385/100–113

(56) References Cited

U.S. PATENT DOCUMENTS

| | | |
|---|---|---|
| 4,673,247 * | 6/1987 | Oestreich ........................ 385/100 X |
| 4,863,983 | 9/1989 | Johnson et al. . |
| 4,983,677 | 1/1991 | Johnson et al. . |
| 5,015,693 | 5/1991 | Duchesne et al. . |

FOREIGN PATENT DOCUMENTS

| | | |
|---|---|---|
| 40 09 101 | 9/1991 | (DE) . |
| 0 490 803 | 6/1992 | (EP) . |
| WO 93/05424 | 3/1993 | (WO) . |
| WO 93/07627 | 4/1993 | (WO) . |
| WO 97/10294 | 3/1997 | (WO) . |

OTHER PUBLICATIONS

Derwent Abstract of JP 09 133847, "Non–Metallic Self–Supporting Optical Cable has Outer Face of Water Repellent Materials", Derwent Publications Ltd., London, GB, (1997).
International Electrotechnical Commission IEC Standard 587, "Test Methods for Evaluating Resistance to Tracking and Erosion of Electrical Insulating Materials used Under Severe Ambient Conditions", pp. 3, 5, 7, 9, 11, 13, 15–18, (1984).

* cited by examiner

Primary Examiner—Phan T. H. Palmer
(74) Attorney, Agent, or Firm—Finnegan, Henderson, Farabow, Garrett & Dunner, L.L.P.

(57) ABSTRACT

An optical fibre cable includes at least one optical fibre and a polymer-based outer sheath, characterized in that the sheath is an extruded double-layer sheath, including an extruded first inner polymer layer and an extruded second outer polymer layer. The first inner polymer layer is substantially devoid of tracking resistance, and the second outer polymer layer has high tracking resistance. The second outer polymer layer includes a polymeric mixture containing a polymer and an inorganic oxide or hydroxide in an amount of at least 40% by weight with respect to the total weight of the second outer polymer layer.

25 Claims, 1 Drawing Sheet

OPTICAL FIBRE CABLE HAVING HIGH TRACKING RESISTANCE

FIELD OF THE INVENTION

The present invention relates to an optical fibre cable having high tracking resistance, particularly suitable for installation along high-voltage overhead lines.

BACKGROUND OF THE INVENTION

An insulating material subjected to the combined action of an electrical gradient and external agents (moisture, solar radiation, pollutants, etc.) is subject to degradation as a result of the phenomenon known as "tracking". This is the situation affecting the material forming the outer sheath of an optical fibre cable suspended near a high-voltage overhead line. The gradient applied is the difference between the potential of the electric field around the cable and the earth, to which the cable is connected by the clamps fixing it to the supporting pylons. In the proximity of these clamps, the insulating material is subject to the maximum variation of the electric field.

When the cable is dry, the high surface resistance of the sheath prevents the flow of current, and consequently there is no evidence of degradation. Exposure to atmospheric agents, and to solar radiation in particular, causes a surface oxidation of the material which increases its affinity for water. When the sheath starts to retain water, and with it the atmospheric pollutants, the surface resistance decreases drastically and current therefore flows through the film of water coating the sheath. This flow of current produces, by the Joule effect, a local heating of the material, with evaporation of the water. The situation becomes critical when the sheath is only partially wet, so that moist areas with low electrical resistance alternate with dry areas with much higher resistance. The high conductivity gradient at the points of separation between dry and moist areas leads to the formation of electrical discharges which intensely overheat the underlying sheath, with consequent degradation of the polymer material and formation of paths (tracking) and true areas of erosion which extend rapidly until the rupture of the material is caused. In the case of polyolefin materials, the degradation is manifested by an initial melting followed by oxidation, with a consequent increase in local wettability and therefore of the number of electrical discharges, such that the polymer is caused to ignite.

The installation of self-supporting optical cables made of dielectric material in the vicinity of high-voltage (usually from 150 to 380 kV) overhead lines therefore requires the use of sheaths with high resistance to the said tracking phenomena, which at the same time have good mechanical properties and low density, so that light cables resistant to mechanical stresses can be produced.

RELATED ART

U.S. Pat. No. 4,673,247 describes optical fibre cables which are particularly suitable for installation along high-voltage overhead lines, and which have an outer sheath consisting of a polymer material (for example an ethylene-vinyl acetate copolymer) in a mixture with a hydroxide, for exale zinc hydroxide, magnesium hydroxide or, preferably, aluminum hydroxide, in quantities corresponding to between 30% and 60% by weight, and preferably approximately 50% by weight. The high quantity of hydroxide present not only has a flame proofing effect but also makes it possible to increase the resistance of the polymer to the tracking phenomena, but inevitably leads to a deterioration of the mechanical properties in terms of modulus and of elongation at break, and to a considerable increase of the density and consequently of the total weight of the cable per unit of length.

To obtain tracking resistance combined with satisfactory mechanical properties, International Patent Application WO 93/05424 describes an optical fibre cable wherein the outer sheath is formed by a composition consisting of linear polyethylene, preferably medium-density linear polyethylene (MDPE), mixed if necessary with low-density branched polyethylene (LIDPE), containing 15% to 30% by weight of magnesium hydroxide or aluminum hydroxide. However, the Applicant has found that compositions of this type, containing low quantities of hydroxide, are capable of passing the ordinary tests for measuring tracking resistance and erosion, such as IEC Standard 587 (1984), only with low potential differences (up to 3 kV), while the results are unsatisfactory in more severe conditions (potential differences up to 4.5 kV).

SUMMARY OF THE INVENTION

EP-490 803 relates to an optical fiber cable, particularly suitable to resist local impacts (e.g. shots from hunters). In that cable, a bundle of tubes containing the optical fibers arranged around a central element resistant to traction and compression and wound with a synthetic strip. That assembly is enclosed by a polyurethane covering which should absorb the impact energy. Around the covering, a layer of aramide fibers is arranged which are in turn hold by two layers consisting of aramide strips wound in opposite directions, which should further improve resistance to impacts. The layers of aramide strips are bold in place by a nylon tape. An external sheath is provided around the tape made from an antitracking extruded material.

The Applicant has now found that it is possible to produce an optical fibre cable provided with both optimal mechanical properties and high tracking resistance, by applying an extruded double-layer outer sheath, wherein the first inner polymer layer is substantially without tracking resistance, while the second outer polymer layer is designed in such a way as to mainly impart high tracking resistance. In this way it is possible to obtain a light optical cable with good mechanical resistance, particularly suitable for installation along high-voltage overhead lines.

In a first aspect, the invention therefore relates to an optical fibre cable having high tracking resistance, comprising at least one optical fibre and a polymer-based outer sheath, characterized in the said sheath is an extruded double-layer sheath, comprising a first inner polymer layer substantially devoid of tracking resistance, and a second outer polymer layer having high tracking resistance and containing an inorganic oxide or hydroxide in an amount of at least 40% by weight with respect to the total weight of a polymeric mixture.

The term "polymer layer substantially devoid of tracking resistance" is used to indicate a polymer-based material which, when subjected to the test for measuring the resistance to tracking and erosion according to IEC Standard 587 (1984), Criterion A, Method 1, is classed in Class 1A0 (none of the five test specimens pass the test if subjected to a potential difference of 2.5 kV for less than 6 hours).

The term "polymer layer having high tracking resistance" is used to indicate a polymer-based material which, when subjected to the test for measuring the resistance to tracking and erosion according to IEC Standard 587 (1984), Criterion A, Method 1, is classed in Class 1A 3.5 (all five test specimens pass the test if subjected to a potential difference of 3.5 kV for at least 6 hours, while none of them passes the test if a potential difference of 4.5 kV is applied for less than 6 hours), or preferably in Class 1A 4.5 (all five test specimens pass the test if subjected to a potential difference of 4.5 kV for at least 6 hours).

DETAILED DESCRIPTION OF THE INVENTION

Figure 1:
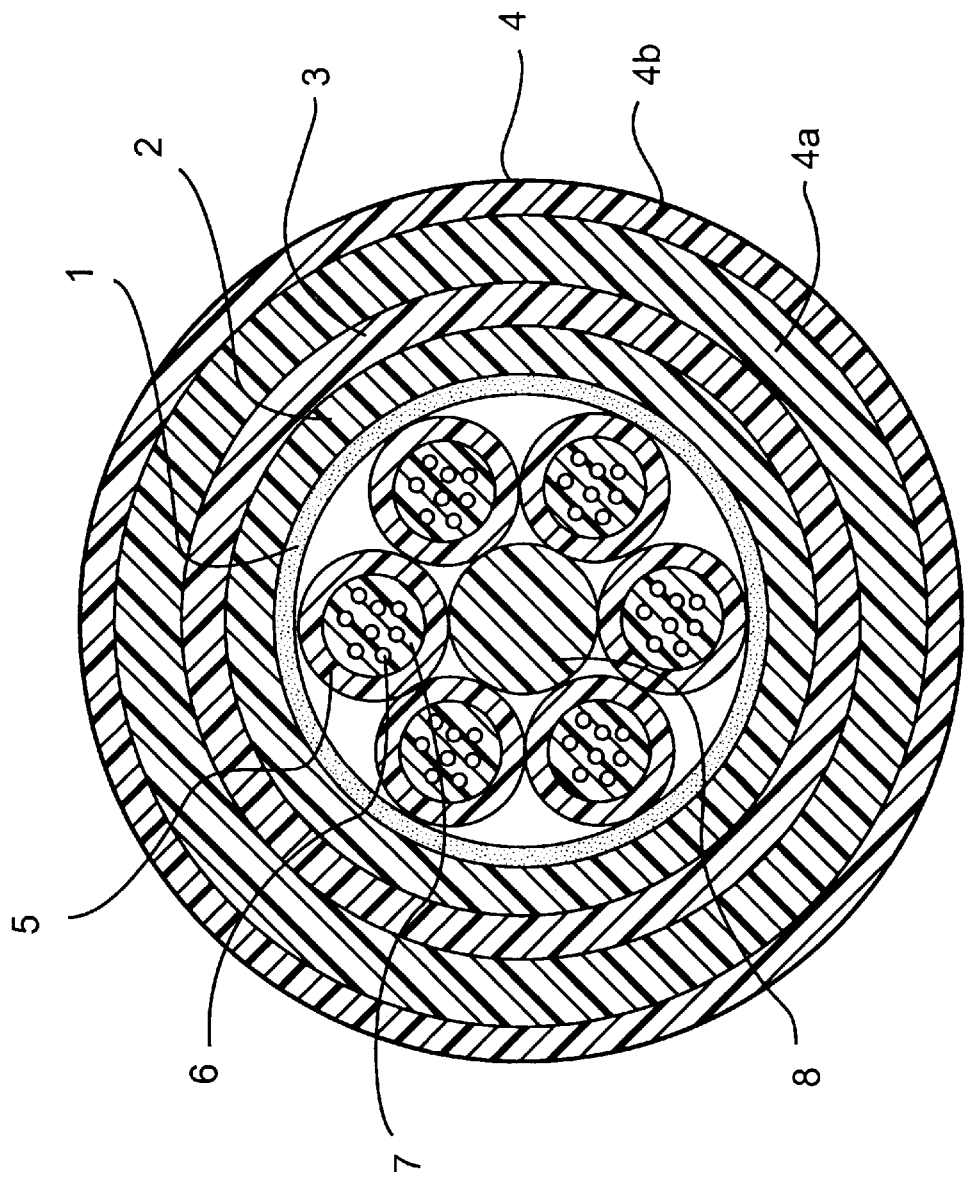
FIG. 1 shows a transverse section of an optical fibre cable made according to the present invention, comprising an optical core (1), an inner sheath (2) made of polymer material (for example low-density polyethylene filled with carbon black, or thermoplastic polyurethane), an armour (3) having the function of reinforcement against tensile stresses (consisting, for example, of glass fibre or a polyaramide thread, for example Kevlar®), and an outer sheath made from two layers (4) according to the present invention, comprising a first inner layer (4a) substantially devoid of tracking resistance and a second outer layer (4b) having high tracking resistance. The optical core (1) consists of a plurality of tubes (5) of polymer material (for example polybutylene terephthalate) inside which are housed the optical fibres (6), which are normally immersed in a buffer material (7) having the function of preventing longitudinal propagation of water in case of accidental breakage. The tubes (5) are stranded around a central support (8), usually made of glass-fibre reinforced plastic, which is capable of limiting the thermal contraction of the cable.

FIG. 1 shows only one possible embodiment of an optical fibre cable according to the present invention. It is evident that suitable modifications known in the art may be made to this embodiment without departure from the scope of the present invention.

In a further aspect, the present invention relates to a combined system for the transport of high voltage electrical energy and optical communications, which comprises at least one high voltage conductor associated with an optical fibre cable with high tracking resistance as described above. This system may be constructed by disposing the optical fibre cable overhead in the proximity of the conductor according to different solutions, depending on the specific design characteristics of the high-voltage overhead line and of the optical cable itself. For example, the optical cable may be self-supporting, being provided with tensile stress resistant elements, having properties of dielectrics or of conductors, in such a way as to form an armour as illustrated by way of example in FIG. 1. Alternatively, the optical cable may be wound on or suspended from a purposely disposed carrying rope, or by using as the carrying rope a ground wire or a phase conductor already present in the overhead line.

It should be noted that the high tracking resistance of the optical fibre cable according to the present invention enables the installation of the cable to be largely unaffected by the electric field gradient generated by the high-voltage conductor. In other words, it is possible to dispose the optical fibre cable in the position which is most convenient in respect of construction, without being strictly limited to the positions in which the electric field generated by the conductor is minimal and therefore the tracking phenomena are small.

The high tracking resistance of the outer layer is preferably achieved by adding to the polymer matrix a predetermined quantity of an inorganic oxide, preferably in a hydrated or hydroxide form. For example, it is possible to use oxides of aluminum, bismuth, cobalt, iron, magnesium, titanium or zinc, the corresponding hydroxides, or mixtures thereof. Among these, aluminum hydroxide, zinc hydroxide, magnesium hydroxide or mixtures thereof are preferred. Magnesium hydroxide is particularly preferred. Limited quantities, generally less than 25% by weight, of one or more inorganic oxides chosen for example from CoO, $TiO_2$, $Sb_2O_3$, ZnO, $Fe_2O_3$ or mixtures thereof, preferably in the hydrated form, may advantageously be added to these compounds or mixtures.

The total quantity of oxide or hydroxide contained in the outer layer is generally between 40% and 75% by weight, preferably between 50% and 70% by weight, and more preferably between 55% and 65% by weight with respect to the total weight of the mixture. These fillers are preferably in the form of particles with sizes varying from 0.1 to 100 $\mu$m, preferably from 0.5 and 10 $\mu$m. Preferably, the metal hydroxides, in particular magnesium hydroxide, are used in the form of coated particles. Materials advantageously usable as coatings are saturated or unsaturated fatty acids containing from 8 to 24 carbon atoms, or their metallic salts, such as oleic, palmitic, stearic, isostearic and lauritic acid, magnesium or zinc stearate or oleate, and similar.

The polymer matrix is preferably the same both for the outer and for the inner layer, and consists of a homopolymer, a copolymer or a polymer mixture selected from those generally used in the art, such as polyolefin, copolymers of different olefins, copolymers of olefins with esters having ethylene unsaturation, polyesters, polyethers, polyether/polyester copolymers, and mixtures thereof. Examples of such polymers are: polyethylene (PE), particularly low-density PE (LDPE), medium-density PE (MDPE), linear low-density PE (LLDPE); polypropylene (PP); thermoplastic copolymers of propylene with another olefin; ethylene/vinyl acetate copolymers (EVA); ethylene/acrylate copolymers, particularly ethylene/ethyl acrylate (EEA) and ethylene/butyl acrylate (EBA) copolymers; ethylene/α-olefin rubbers, particularly ethylene/propylene rubbers (EPR), and ethylene/propylene/diene rubbers (EPDM); natural rubber; butyl rubbers; and mixtures thereof. Among these, particularly preferred are: ethylene/vinyl acetate copolymers (EVA), with a vinyl acetate content generally between 18% and 35% by weight; mixtures of EVA copolymers with PE, particularly with linear low-density PE (LLDPE) wherein the content of LLDPE is generally between 30% and 50% by weight with respect to the weight of the total polymer component.

The ratio between the thickness of the outer layer (having high tacking resistance) and the thickness of the inner layer (substantially without tracking resistance) is generally between 1:6 and 1:1, and preferably between 1:4 and 1:2. In any case, the thickness of the outer layer is generally not less than 0.2 mm, and preferably not less than 0.3 mm.

Other components known in the art, such as carbon black, antioxidants, coupling agents, degradation inhibitors, pigments and similar, may optionally be added to the polymer matrix of both the outer and the inner layer, in variable quantities which can easily be determined by those skilled in the art according to the specific requirements of use.

For example, antioxidant agents commonly used in the art are aromatic polyamines, sterically hindered phenols, phosphites and phosphonites, such as: polymerized 2,2, 4trimethyl-1,2-dihydroquinoline, tetrakis methylene(3,5-ditertbutyl-4-hydroxyhydrocinnamate) methane, bis(3,5-ditertbutyl-4-hydroxyhydrocinnamate), n-octadecyl-3(3',5'- di-t-butyl-4-hydroxyphenyl) propionate and tris(2,4-ditertbutylphenyl) phosphite.

The coupling agents may be chosen from those known in the art, for example silane compounds or carboxylated polyolefins. Examples of silane compounds suitable for the purpose are: γ-methacryloxy-propyltrimethoxy silane, methylthiomethoxy silane, methyltris-2-methoxyethoxy) silane, dimethyldiethoxy silane, vinyltris-2-methoxyethoxy) silane, vinyltrimethoxy silane, vinyltriethoxy silane, octyltriethoxy silane, isobutyl-triethoxy silane, isobutyl-trimethoxy silane, and mixtures thereof.

Where carboxylated polyolefins are concerned, these are derived from polyolefins containing ethylene unsaturations herein carboxyl groups have been inserted by reaction with suitable unsaturated carboxyl derivatives, for example anhydrides of unsaturated carboxyl or dicarboxyl acids, preferably of dicarboxyl acids, for example acetic anhydride, benzoic anhydride and maleic anhydride; maleic anhydrde is particularly preferred. Carboxylated polyolefins particularly suitable for this purpose are ethylene/propylene/diene monomer terpolymers modified with maleic anhydride (for example, the commercial products Exxelor® and Royaltuf®), or polyethylene or polypropylene modified with maleic anhydride (for example the products known under the trade name Orevac®).

The polymer matrix is preferably of a thermoplastic type, in other words not cross-linked, or may be cross-linked by known methods, for example by adding a suitable cross-linking agent, for example a silane, to the mixture, or by irradiation.

In a preferred embodiment, an additive capable of imparting water-repellent characteristics to the material, for example a silicone oil or a fluorinated polymer, may be added to the polymer mixture of the outer layer of the sheath according to the present invention. In particular, the fluorinated polymer may be selected from homopolymers of a fluorinated monomer (for example polyvinylidene fluoride) or from copolymers of a fluorinated monomer with one or more fluorinated or non-fluorinated comonomers (for example, copolymers of vinylidene fluoride and a perfluorinated comonomer such as hexafluoropropene and/or tetrafluoroethylene; copolymers of tetrafluoroethylene with ethylene and/or propylene; etc.). These fluorinated additives, normally used as extrusion coadjuvants for polyolefins, are described for example in the patents U.S. Pat. No. 4,863,983, U.S. Pat. No. 4,983,677, U.S. Pat. No. 5,015,693 and WO-97/10294, and are available commercially under the trade name Dynamar® (Dyneon/3M-Hoechst). The additive, which imparts water-repellent characteristics, leads to a significant improvement of the tracking resistance, such as to enable the quantity of anti-tracking additive present in the outer layer to be decreased if required. The quantity of additive having a water-repellent effect may vary according to the characteristics of the polymer matrix and of the additive, and is generally between 0.01% and 12% by weight, and preferably between 0.1% and 8% by weight with respect to the weight of the polymer matrix.

Typically the mixtures for the inner and outer layers are prepared separately, by mixing the polymer components and the appropriate additives according to conventional methods, for example in an internal mixer of the type with tangential rotors (Banbury) or with interpenetrating rotors, or in other mixers of the continuous type, for example the Ko-Kneader (Buss) or twin-screw type.

The polymer mixtures thus obtained are subsequently used to coat the core of optical fibres by extrusion. The coating with the double-layer sheath may take place in two separate stages, the inner layer being extruded onto the core of optical fibres in a first pass, and the outer layer being extruded onto the inner layer in a second pass. The coating process may advantageously be carried out in a single stage, for example by a "tandem"method, in which two individual extruders are used, disposed in sequence, or by a co-extrusion method, in which two extruders are used, meeting at a single extrusion head capable of extruding the two layers simultaneously onto the core of optical fibres.

Some examples illustrating the present invention are described below.

Preparation of the Polymer Mixtures and of the Test Specimens

Six polymer mixtures were prepared, their compositions being shown in Table 1.

The mixtures were produced by using a Banbury-type closed mixer, with the basic polymer components introduced first, followed by the mineral filler (magnesium hydroxide), if any, and finally the other components in rapid succession. The mixture was processed until it reached approximately 160° C. and then discharged and processed further in an open cylinder mixer pre-heated to a temperature close to the melting point of the mixture. After processing for approximately 2 minutes, a sheet of mixture was obtained, and this was then press-moulded at 180° C. into the form of a plaque having the desired thickness.

TABLE 1

| Mixture composition (% by weight) | M1 | M2 | M3 | M4 | M5 | M6 |
|---|---|---|---|---|---|---|
| EVA | — | — | — | 26.5 | 18.7 | 17.0 |
| LDPE | 100 | — | — | — | — | — |
| LLDPE | — | — | — | 7.6 | 14.9 | 13.6 |
| MDPE | — | 100 | 75 | — | — | — |
| EPDM/MA | — | — | — | 3.8 | 3.7 | 3.4 |
| Mg(OH)$_2$ | — | — | 25 | 60.7 | 59.8 | 64.7 |
| Fluorinated additive | — | — | — | — | 1.5 | — |
| Antioxidant | — | — | — | 0.1 | 0.1 | 0.1 |
| Carbon black | — | — | — | 1.3 | 1.3 | 1.2 |

EVA: ethylene/vinyl acetate copolymer (28% by weight of vinyl acetate) (product Elvax® 265 - Du Pont);
LDPE: low-density polyethylene (d = 0.925) containing 2.5% by weight of carbon black (product LE 0588 - Borealis);
LLDPE: linear low-density polyethylene (d = 0.918) (product Escorene® LL1004 - Exxon);
MDPE: medium-density polyethylene (d = 0.938) containing 2.5% by weight of carbon black (product ME 3420 - Borealis);
EPDM/MA: ethylene/propylene/diene copolymer modified with approximately 1% by weight of maleic anhydride (product Exxelor® VA 1810 - Exxon);
Mg(OH)$_2$: product Kisuma® 5A (Kiowa Chem.);
Fluorinated additive: product Dynamar® FX 9613 (Dyneon/3M-Hoechst);
Antioxidant: Irganox® 1010 (Ciba-Geigy) (tetrakis-methylene(3,5-ditertbutyl-4-hydroxyhydrocinnamate) methane);
Carbon black: product Vulcan® P (Cabot).

Test of Tracking Resistance

The test specimens for the test of resistance to tracking and erosion according to IEC Standard 587 (1984), Criterion A, Method 1 were taken from plates prepared as above. In the case of the double-layer sheath according to the present invention, the individual layers were moulded separately and then joined in the press at 180° C. In all cases, the test specimens had an overall thickness of 6.0 mm. The specific conditions of the test are stated in the said IEC Standard 587 (1984). The results for the various test specimens are shown in Table 2, where the mechanical properties are also shown in terms of tensile modulus, determined at 60° C. according to the method of IEC 811-1.

TABLE 2

| Example | Type | Materials | Specific weight (kg/dm³) | Tracking resistance (IEC 587) | Tensile modulus (MPa) (IEC 811-1) |
|---|---|---|---|---|---|
| 1 | single layer | M1 | 0.93 | 0 | 350 |
| 2 | single layer | M2 | 0.95 | 0 | 450 |
| 3 | single layer | M3 | 1.10 | 1A 2.5 | 350 |
| 4 | single layer | M4 | 1.48 | 1A 3.5 | 140 |
| 5 | single layer | M5 | 1.50 | 1A 4.5 | 280 |
| 6 | single layer | M6 | 1.54 | 1A 4.5 | 280 |
| 7 | double layer | M2 (inner) + M5 (outer) | — | 1A 4.5 | 390 |
| 8 | double layer | M2 (inner) + M6 (outer) | — | 1A 4.5 | 390 |

In the case of the double-layer test specimens (Examples 7 and 8), the layer without tracking resistance (the inner layer) had a thickness of 4 mm, and the layer with added $Mg(OH)_2$ (the outer layer) had a thickness of 2 mm (ratio between outer and inner layer: 1:2).

As may be noted, the double-layer sheaths according to the present invention (Examples 7 and 8) have high tracking resistance (more than 4.5 kV) and high mechanical strength. With a single-layer sheath it is possible to obtain good tracking resistance (see Examples 5 and 6) but with a concomitant worsening of the mechanical properties and a considerable increase in the specific weight of the material.

It should be noted that good mechanical characteristics of the sheath are essential for a correct operation of the system consisting of the cable associated with the terminal accessories (i.e. the devices for fixing the cable to the support pylons of the overhead line), and in particular for an effective transfer of the axial pull of the installation from the terminal accessory, connected to the pylon, to the reinforcing armour (consisting of aramide threads, for example) underlying the sheath.

Installation of the Optical Fibre Cable Along an Overhead Line

The installation pull (T) has been calculated for an optical fibre cable with the various types of outer sheath shown in Table 2, assuming a structure such as that shown in FIG. 1 in which the reinforcing armour consists of Kevlar® thread. The conditions of calculation are as follows:

length of span (L): 300 m;
initial deflection (f): 3 m (1% of the span);
external diameter of the cable (D): 16.75 mm;
internal diameter of the outer sheath (d): 13.75 mm;
overall thickness of the outer sheath (s=(D−d)/2): 1.5 mm (thickness of the outer layer: 0.5 mm, thickness of the inner layer: 1 mm);
specific weight of the outer sheath (γ): as shown in Table 2 (for double-layer sheaths, the two components must be added together);
weight of the cable excluding the outer sheath ($P_0$): 115 kg/km;
rigidity (total modulus not normalized over the section) of the individual Kevlar® thread ($E_0$): 6000 kg;
tensile margin ($\Delta L_{max}$), i.e. maximum elongation of the cable without elongation of the optical fibres: 5%.

The total weight of the cable (P) is given by:

$$P = P_0 + (\pi/4) \cdot s^2 \cdot \gamma$$

while the installation pull (T) is expressed by the following formula:

$$T = (P \cdot L^2)/(8 \cdot f).$$

On the hypothesis that the rigidity of the cable in tension is practically equal to the rigidity of the individual aramide thread multiplied by the total number of threads ($n_f$), it is possible to calculate the number of Kevlar® threads necessary to remain within the tensile margin according to the following formula:

$$n_f = T/(E_0 \cdot \Delta L_{max}).$$

The results are shown in Table 3 below.

TABLE 3

| Example | Cable weight (P) (kg/m) | Pull (T) (kg) | Number of threads ($n_f$) |
|---|---|---|---|
| 1 | 0.181 | 681.0 | 23 |
| 2 | 0.194 | 686.4 | 23 |
| 3 | 0.194 | 726.7 | 25 |
| 4 | 0.221 | 828.8 | 28 |
| 5 | 0.224 | 840.0 | 28 |
| 6 | 0.225 | 844.9 | 29 |
| 7 | 0.198 | 742.5 | 25 |
| 8 | 0.199 | 746.3 | 25 |

As may be noted, with the double-layer sheath according to the present invention it is possible, for the same tracking resistance, to reduce the overall weight of the cable and consequently the installation pull and the number of aramide reinforcing threads (compare Examples 7 and 8 according to the invention with Examples 5 and 6 provided for comparison).

What is claimed is:

1. Optical fibre cable comprising at least one optical fibre and a polymer-based outer sheath, characterized in that said sheath is an extruded double-layer sheath, comprising an extruded first inner polymer layer and an extruded second outer polymer layer, said first inner polymer layer substantially devoid of tracking resistance, and said second outer polymer layer having high tracking resistance and comprising a polymeric mixture containing a polymer and an inorganic oxide or hydroxide in an amount of at least 40% by weight with respect to the total weight of the second outer polymer layer.

2. Cable according to claim 1, wherein the first inner polymer layer, when subjected to test for measurement of resistance to tracking and erosion according to IEC Standard 587 (1984), Criterion A, Method 1, is classed in Class 1A 0, while the second outer polymer layer, when subjected to the same test, is classed in Class 1A 3.5.

3. Cable according to claim 1, wherein the first inner polymer layer, when subjected to test for measurement of resistance to tracking and erosion according to IEC Standard 587 (1984), Criterion A, Method 1, is classed in Class 1A 0, while the second outer polymer layer, when subjected to the same test, is classed in Class 1A 4.5.

4. Cable according to claim 1, wherein the inorganic oxide or hydroxide is an oxide of aluminum bismuth, cobalt, iron, magnesium, titanium or zinc, or a corresponding hydroxide, or mixtures thereof.

5. Cable according to claim 4, wherein the inorganic hydroxide is aluminum hydroxide, zinc hydroxide or magnesium hydroxide, or mixtures thereof.

6. Cable according to claim 5, wherein the hydroxide is in admixture with one or more inorganic oxides or hydroxides of CoO, $TiO_2$, $Sb_2O_3$, ZnO, $Fe_2O_3$, or a corresponding hydroxide, or mixtures thereof.

7. Cable according to claim 1, wherein the total amount of oxide or hydroxide contained in the outer layer is between 40% and 75% by weight with respect to the total weight of the polymeric mixture.

8. Cable according to claim 7, wherein the total quantity of oxide or hydroxide contained in the outer layer is between 50% and 70% by weight with respect to the total weight of the polymeric mixture.

9. Cable according to claim 8, wherein the total quantity of oxide or hydroxide contained in the outer layer is between 55% and 65% by weight with respect to the total weight of the polymeric mixture.

10. Cable according to claim 1, wherein the outer and inner layers have a polymer matrix of one or more polyolefins, copolymers of different olefins, copolymers of olefins with esters having ethylene unsaturation, polyesters, polyethers, polyether/polyester copolymers, or mixtures thereof.

11. Cable according to claim 10, wherein the polymer matrix is selected from the group consisting of polyethylene (PE); polypropylene (PP); thermoplastic copolymers of propylene with another olefin; ethylene/vinyl acetate copolymers (EVA); ethylene/acrylate copolymers; ethylene/α-olefin rubbers; natural rubber; butyl rubbers; and mixtures thereof.

12. Cable according to claim 11, wherein the polymer matrix is selected from the group consisting of ethylene/vinyl acetate copolymers (EVA), with a vinyl acetate content of from 18% to 35% by weight; and mixtures of EVA copolymers with linear low-density PE (LLDPE) wherein the content of LLDPE is from 30% to 50% by weight with respect to the weight of the total polymeric components.

13. Cable according to any one of claims 1 or 10–12, wherein the inner layer and the outer layer have the same polymer matrix.

14. Cable according to claim 1, wherein the ratio between the thickness of the outer layer and the thickness of the inner layer is between 1:6 and 1:1.

15. Cable according to claim 14, wherein the ratio between the thickness of the outer layer and the thickness of the inner layer is between 1:4 and 1:2.

16. Cable according to claim 1, wherein the thickness of the outer layer is not less than 0.2 mm.

17. Cable according to claim 16, wherein the thickness of the outer layer is not less than 0.3 mm.

18. Cable according to claim 1, wherein the polymeric mixture of the outer layer comprises an additive capable of imparting water repellent characteristics to the cable.

19. Cable according to claim 18, wherein said additive is a silicone oil or a fluorinated polymer.

20. Cable according to claim 19, wherein said fluorinated polymer is a homopolymer of a fluorinated monomer on a copolymer of a fluorinated monomer with one or more fluorinated or non-fluorinated comonomers.

21. Cable according to any one of claims 18 to 20, wherein said additive is present in quantities of between 0.01% and 12% by weight with respect to the weight of the polymer matrix.

22. Cable according to claim 21, wherein said additive is present in quantities of between 0.1% and 8% by weight with respect to the weight of the polymer matrix.

23. Combined system for transporting high voltage electrical energy and optical communications, which comprises at least one high voltage conductor associated with an optical fibre cable having high tracking resistance according to claim 1.

24. System according to claim 23, wherein the optical fibre cable is self-supporting, being provided with tensile stress resistant elements.

25. System according to claim 23, wherein the optical fibre cable is wound on or suspended from a carrying rope.

* * * * *